US007961081B2

(12) United States Patent
Tomlienovic et al.

(10) Patent No.: US 7,961,081 B2
(45) Date of Patent: Jun. 14, 2011

(54) ANTI-THEFT SYSTEM AND METHOD

(76) Inventors: John Tomlienovic, Glendale, CA (US); Lee Knight, Glendale, CA (US)

( * ) Notice: Subject to any disclaimer, the term of this patent is extended or adjusted under 35 U.S.C. 154(b) by 535 days.

(21) Appl. No.: 10/850,624

(22) Filed: May 21, 2004

(65) Prior Publication Data

US 2005/0012591 A1 Jan. 20, 2005

Related U.S. Application Data

(60) Provisional application No. 60/473,011, filed on May 22, 2003.

(51) Int. Cl.
*B60R 25/10* (2006.01)

(52) U.S. Cl. ........... 340/426.1; 340/426.16; 340/426.19; 340/426.2; 340/539.13; 340/988; 342/357; 342/457; 701/24; 701/213

(58) Field of Classification Search ............... 340/539.1, 340/539.13, 539.26, 541, 572.1, 572.4, 568.1, 340/686.1, 426.18, 426.19, 426.21, 426.1, 340/426.2, 426.11, 988, 426.16, 825.49, 340/825.69, 990; 701/36, 29, 35, 213, 24, 701/45; 348/143, 148; 342/357, 457
See application file for complete search history.

(56) References Cited

U.S. PATENT DOCUMENTS

| | | | | |
|---|---|---|---|---|
| 4,276,540 A | | 6/1981 | Habib, Jr. | |
| 4,891,650 A | | 1/1990 | Sheffer | |
| 5,032,845 A | | 7/1991 | Velasco | |
| 5,223,844 A | | 6/1993 | Mansell et al. | |
| 5,475,597 A | * | 12/1995 | Buck | 455/456.5 |
| 5,559,496 A | * | 9/1996 | Dubats | 340/539.26 |
| 5,898,391 A | | 4/1999 | Jefferies et al. | |
| 5,929,753 A | | 7/1999 | Montague | |
| 5,963,131 A | * | 10/1999 | D'Angelo et al. | 340/568.1 |
| 6,043,733 A | | 3/2000 | Lind | |
| 6,083,353 A | * | 7/2000 | Alexander, Jr. | 202/158 |
| 6,157,317 A | * | 12/2000 | Walker | 340/7.1 |
| 6,163,338 A | * | 12/2000 | Johnson et al. | 348/148 |
| 6,166,627 A | | 12/2000 | Reeley | |
| 6,331,825 B1 | * | 12/2001 | Ladner et al. | 340/988 |
| 6,405,112 B1 | * | 6/2002 | Rayner | 701/35 |
| 6,469,641 B1 | * | 10/2002 | Lash et al. | 340/984 |
| 6,531,962 B2 | * | 3/2003 | Sudolcan | 340/571 |
| 6,847,892 B2 | * | 1/2005 | Zhou et al. | 701/213 |
| 6,900,731 B2 | * | 5/2005 | Kreiner et al. | 340/572.1 |
| 2004/0066302 A1 | * | 4/2004 | Menard et al. | |

* cited by examiner

*Primary Examiner* — Hung T. Nguyen
(74) *Attorney, Agent, or Firm* — Francis Law Group

(57) ABSTRACT

A system and apparatus for detecting unauthorized movement of a moveable object where the system includes a GPS receiver, cellular modulator, processor, pager modem, sensor and two-way pager. When the system is coupled to a moveable object and is armed via the pager, the sensor is monitored by the processor to determine when a possible theft of the moveable object may be occurring. In an embodiment, the sensor is a multiple axis accelerometer. In one embodiment the accelerometer is a two axes accelerometer where the sensor detects small movements of the object is two axes. When the sensor is triggered, the processor pages the two-way pager. The processor also determines the system's location via the GPS receiver. The processor generates a message including the system's location and unique system identifier. The processor transmits the message to a monitoring center via a cellular network (and the cellular modulator). In one embodiment, the message is a text message and transmitted using a GSM, GPRS, or Short Messaging Service cellular based network.

8 Claims, 4 Drawing Sheets

ANTI-THEFT SYSTEM AND METHOD

CROSS REFERENCE TO RELATED APPLICATIONS

This invention is related to Provisional Patent Application 60/473,011, filed May 22, 2003, and entitled "Anti-theft system and method", which is hereby incorporated by reference for its teachings.

BACKGROUND OF THE INVENTION

I. Field of the Invention

The invention relates to methods and apparatus for preventing theft of movable objects, and more particularly, to preventing theft of motorized vehicles.

II. Description of the Related Art

Anti-theft systems for movable objects ideally track the movable object when a theft has occurred. Traceable anti-theft systems are commonly large and expensive. It is desirable to have a traceable anti-theft system that is small, concealable, and inexpensive. For example, a motorcycle may be easily stolen but present traceable anti-theft systems her concealable nor effective for such a moveable object. A need thus exists for a small concealable, inexpensive traceable anti-theft system.

SUMMARY OF THE INVENTION

The present invention includes a small, concealable, inexpensive traceable anti theft system. The system includes a GPS receiver, cellular modulator, processor, pager modem, sensor and two-way pager. When the system is coupled to a moveable object and is armed via the pager, the sensor is monitored by the processor to determine when a possible theft of the moveable object may be occurring. In an embodiment, the sensor is a multiple axis accelerometer. In one embodiment the accelerometer is a two axes accelerometer where the sensor detects small movements of the object is two axes. When the sensor is triggered, the processor pages the two-way pager. The processor also determines the system's location via the GPS receiver. The processor generates a message including the system's location and unique system identifier. The processor transmits the message to a monitoring center via a cellular network (and the cellular modulator). In one embodiment, the message is a text message and transmitted using a GSM, GPRS, or Short Messaging Service cellular based network.

The monitoring center may automatically perform a number of tasks upon receipt of such a message. The center may log the time and date receipt and forward the tracking information to a police computer or office. The monitoring center may also contact a designated contact (such as the object's owner or custodian) via a pager, or series of telephone numbers, email, or other electronic means.

The GPS antenna is ideally a small omni directional antenna that may be hidden in the moveable object. The cellular antenna is also ideally a small omni directional antenna that may be hidden in the moveable object. For example, when the movable object is a motorcycle, the GPS and cellular antenna may be mounted in a holding apparatus. The holding apparatus may be mounted directly on the frame or handle bars of motorcycle. The apparatus may also be mounted in concealed locations such as on the fairing, fenders, seats, or saddlebags. The omni directional nature of each antenna permits them to operate (receive/transmit signals) in these locations.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
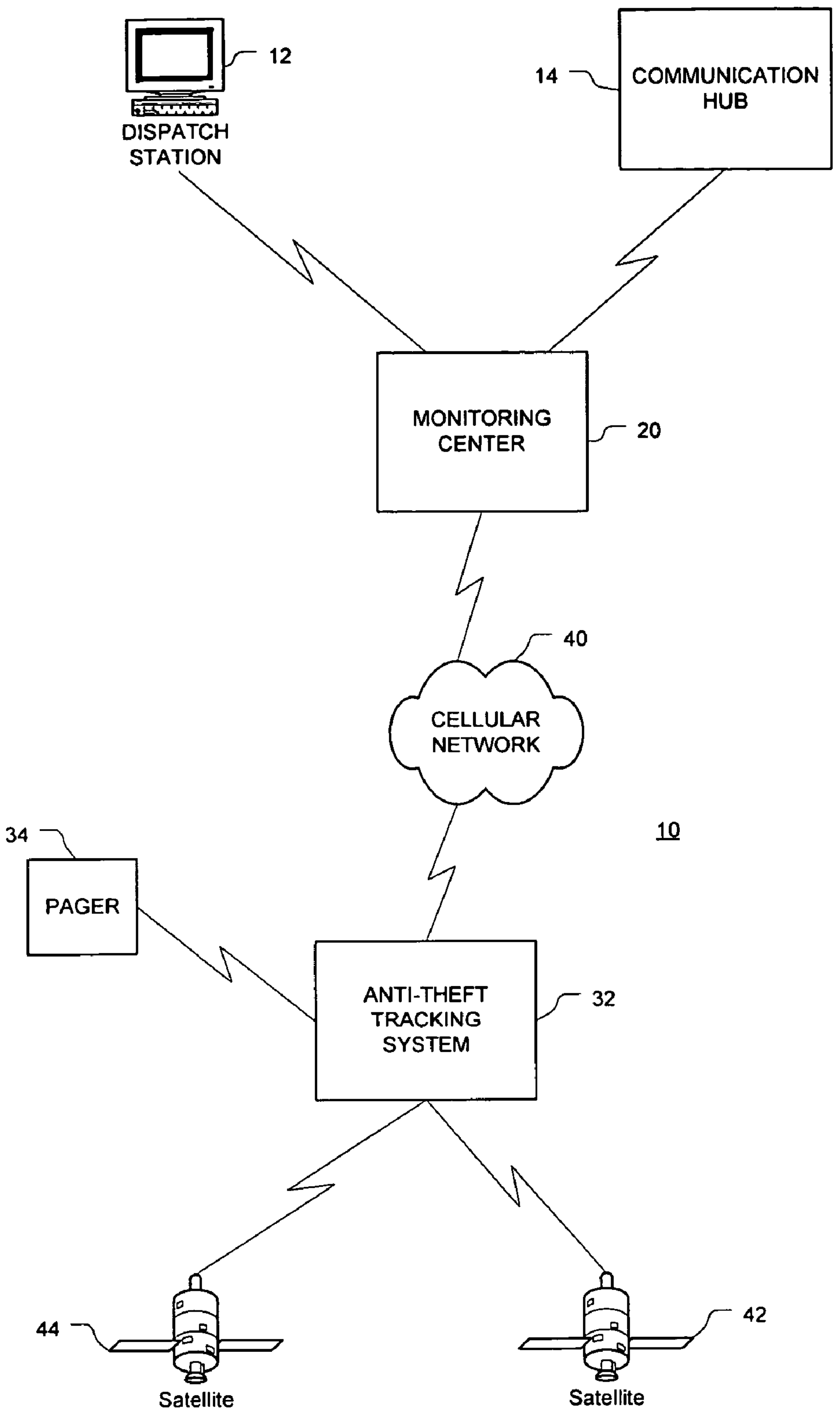
FIG. 1 is an illustration of an anti-theft architecture according to an embodiment of the present invention.

FIG. 1 is a block diagram of an anti-theft architecture 10 of the present invention. The system 10 includes an anti-theft tracking system ("ATS") 32 (mounted on a moveable object), pager 34, GPS satellites network 42, 44, cellular network 40, monitoring center 20, dispatch station 12, and communication hub 14. The dispatch station 12 may be operated by a police department. When the system 32 generates a theft message (including a location and identifier), the monitoring center may forward this information to the dispatch station 12 and a communication center 14. The communication hub 14 may alert the owner or custodian of the object that a theft may be occurring. The monitoring center 20 may be completely automated or may have one or more human operators that help process and forward theft messages to the appropriate individuals or organizations.

Figure 2:
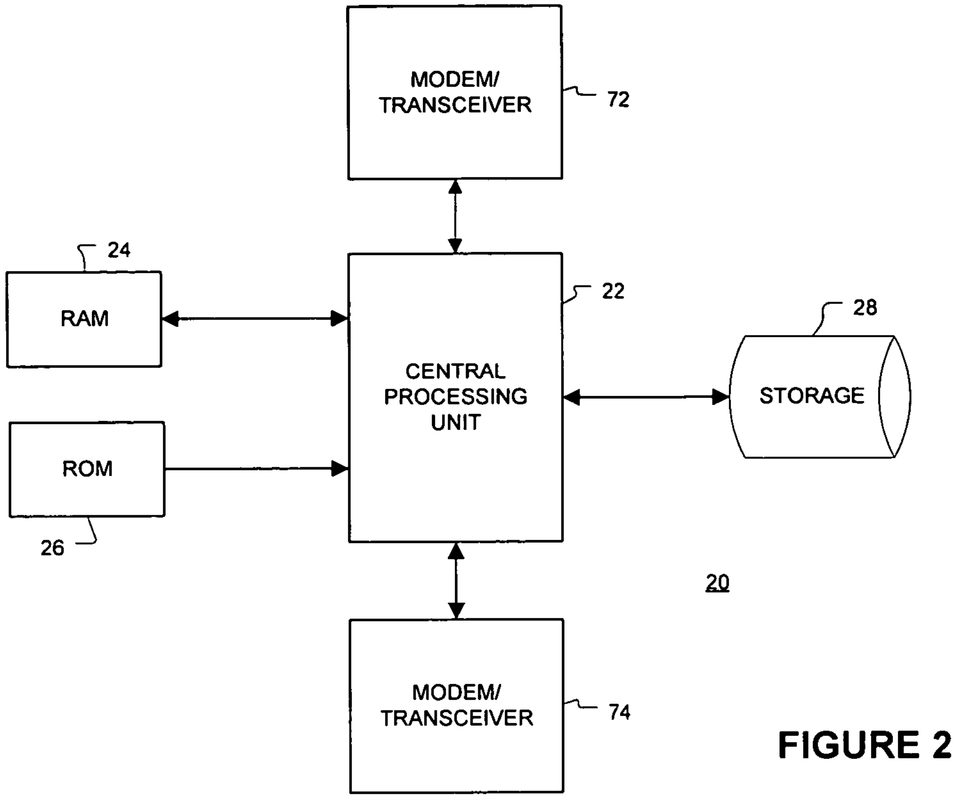
FIG. 2 illustrates a monitoring center system of the present invention in functional block diagram format.

FIG. 2 illustrates an exemplary monitoring center system ("MCS") 20 of the present invention in functional block diagram format. The MCS 20 includes a CPU 22, a RAM 24, a ROM 26, a storage unit 28, a first modem/transceiver 72 and a second modem/transceiver 74. The first modem/transceiver 72 couples the NMC 20 to the dispatch station 12 and communication hub 14. The modem/transceiver 72 may be an Ethernet modem connecting the MCS to a local network or Internet. The second modem/transceiver 74 couples the MCS 20 the cellular network 40. The modem/transceiver may again be an Ethernet modem, telephone modem, wireless modem or other communication device that may communicate with the cellular network 40. The CPU 22 directs communications between the first and second modem 72 and 74 for messages between the dispatch terminals 12 and 14 and one or more ATS 32. It is noted that the MCS 20 may handle messages from numerous ATS 32 at various geographical locations and may forward the message to different dispatch stations as a function of the indicated location of the ATS 32 (as noted in the received message). The ROM 26 may store program instructions to be executed by the CPU 22. The RAM 24 may be used to store temporary program information. The MCS 20 may log received messages in the storage 28.

Figure 3:
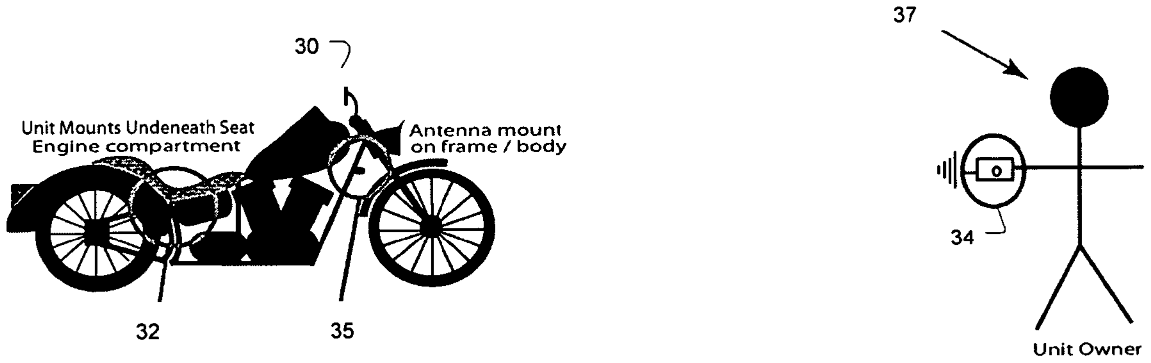
FIG. 3 illustrates an application of the present invention in functional block diagram format.

FIG. 3 illustrates an application of the present invention in functional block diagram format. In this application, an ATS 32 is mounted on a motorcycle 30. The ATS 32 is ideally mounted in a concealed location such as under the seat. The ATS 32 is also ideally coupled to the motorcycle's battery. In a preferred embodiment, the ATS 32 has its own battery that operates when the motorcycle's battery signal is insufficient. In FIG. 3, the GPS antenna and cellular antenna 35 are mounted in the frame. A user 37 may arm the ATS 32 via a two-way pager 34. The ATS 32 may signal the user 37 via the pager 34 when a sensor triggering occurs (potential theft).

Figure 4:
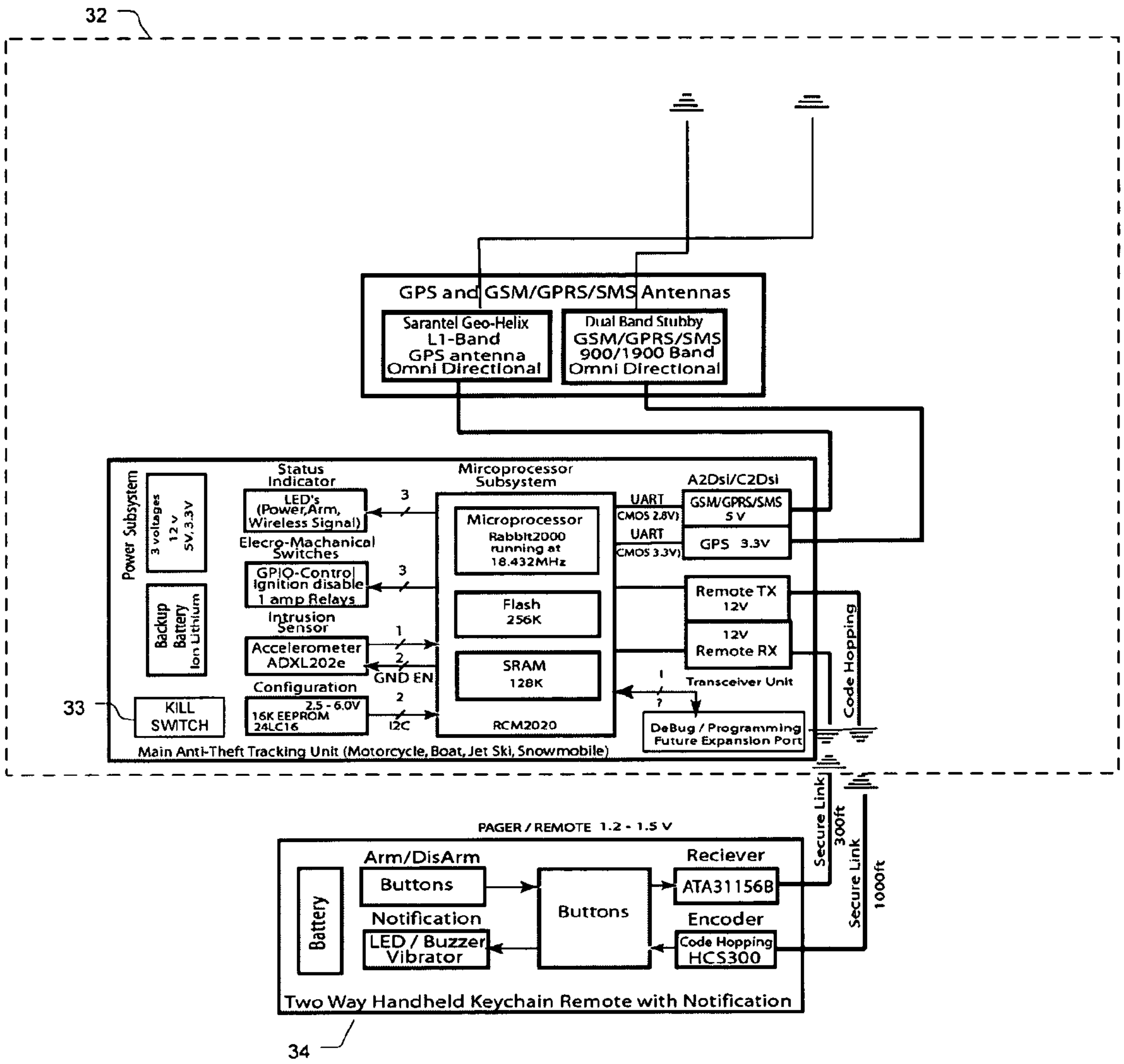
FIG. 4 illustrates an embodiment of an anti-theft tracking system and a two-way pager of the present invention in functional block diagram format.

FIG. 4 illustrates an embodiment of an anti-theft tracking system 32 and a two-way pager 34 of the present invention in functional block diagram format. FIG. 4 details specific components that may be employed in an ATS 32 and pager 34 in accordance with one embodiment of the present invention. In an exemplary embodiment, the ATS 32 includes a GPS and a GSM/GPRS/SMS Antenna and a main board including the exemplary components shown in FIG. 4. In an exemplary embodiment the pager 34 includes the exemplary components shown in FIG. 4. In this exemplary embodiment the sensor includes a multiple axis accelerometer. The sensor may also detect movement by comparing GPS positions when armed and indicating an alarm when the GPS position indicates a change in position.

In an exemplary embodiment, the ATS 32 further includes a kill switch component that is connected to a main controller of the device where the ATS 32 is coupled to the device and designed to prevent theft of the device. The kill switch component 33 may direct the device main controller to shut down the engine or other components to make the device unusable.

Figure 5:
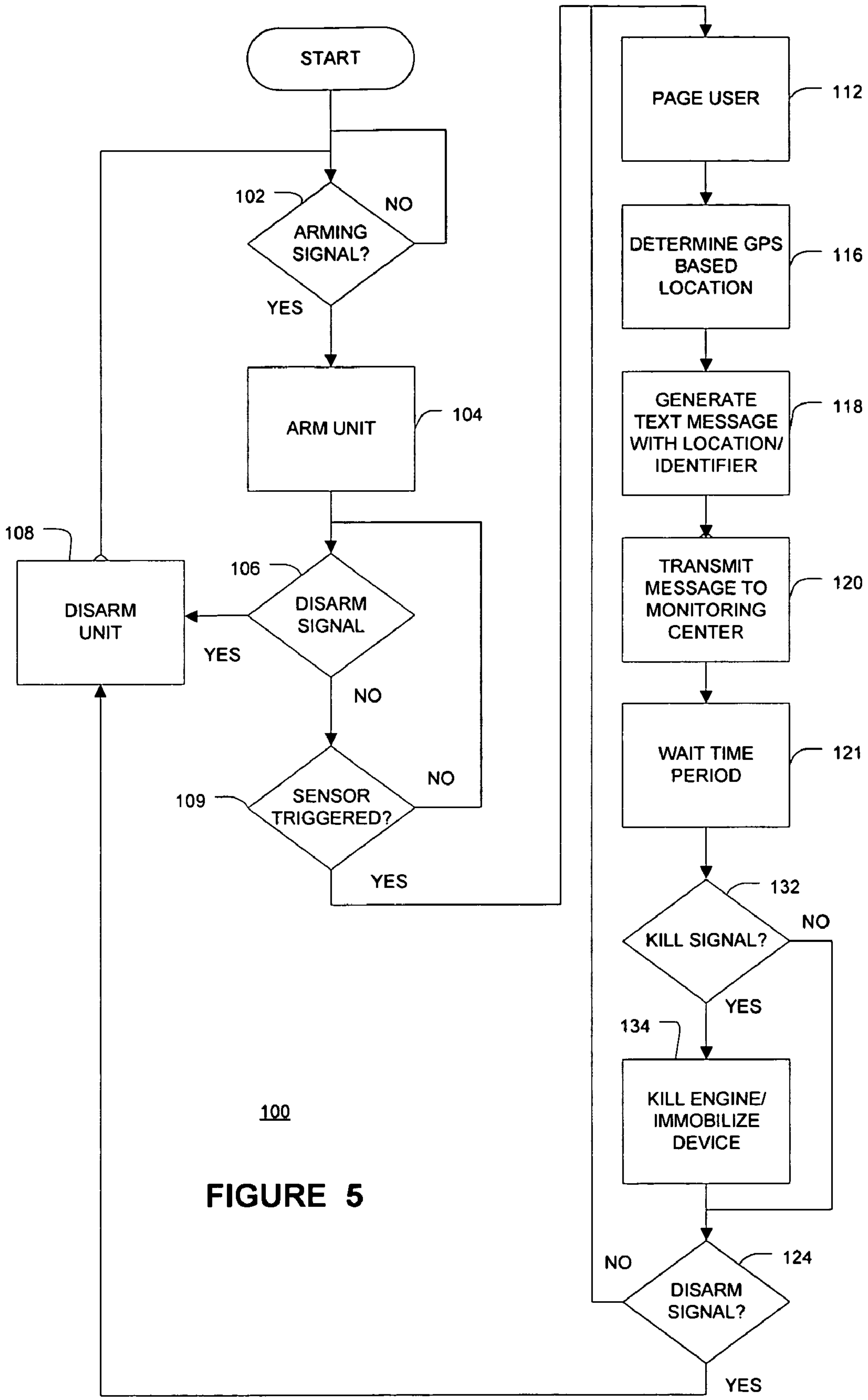
FIG. 5 illustrates an algorithm for an anti-theft tracking system in accordance with the present invention in flowchart format.

FIG. 5 illustrates an algorithm 100 for an ATS 32 in accordance with the present invention in flowchart format. As shown in FIG. 5, the ATS 32 determines when a sensor is triggered when it is armed (steps 102-109). When the sensor is triggered, the ATS 32 pages a user via the pager (step 112), determines the location of the ATS via a GPS system (step 116), generates a message including the location and a unique identifier for the ATS 32 (step 118), and transmits the message to a monitoring center (step 120). The ATS repeats steps 112-120 periodically until the ATS is disarmed (steps 121 and 124). In an exemplary embodiment the process 100 directs the device to kill an engine or otherwise immobilize the device (step 134) when a kill signal is received/detected (step 132).

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. A system for detecting unauthorized movement of a vehicle, the system comprising:

a cellular transmission network;

a GPS subsystem adapted to determine at least a first pre-activation position of said vehicle and at least a second position of said vehicle when said vehicle is moved from said first pre-activation vehicle position, said GPS subsystem being further adapted to generate and transmit a first vehicle position signal representing said first pre-activation vehicle position and a second vehicle position signal representing said second vehicle position;

a vehicle anti-theft subsystem, said anti-theft subsystem including a first computer processing unit (CPU), first storage means in communication with said first CPU, a GPS receiver, an omni-directional GPS antenna, an omni-directional cellular antenna, a movement sensor and vehicle immobilizing means, said movement sensor being in communication with said first CPU and adapted to generate and transmit at least a first movement signal when said vehicle is moved from said first pre-activation vehicle position to said second vehicle position, said GPS antenna being adapted to receive said first and second vehicle position signals from said GPS system, said GPS receiver being in communication with said GPS antenna and said first CPU and adapted to receive said first and second vehicle position signals from said GPS antenna, said GPS receiver being further adapted to transmit said first and second vehicle position signals to said first CPU, said first CPU being programmed to receive an activation signal to activate said anti-theft subsystem, receive said first and second vehicle position signals and said first movement signal, generate a first alarm signal and an immobilizing signal in response to said first movement signal, transmit said immobilizing signal to said vehicle immobilizing means, and transmit said first alarm signal, said second vehicle position signal and a unique vehicle identification code to said cellular antenna, said identification code being stored in said storage means;

a monitoring station having a second CPU, at least second storage means, a first modem-transceiver and a second modem-transceiver, said second storage means being in communication with said second CPU and including at least a first control algorithm and operating instructions associated therewith, said first modem-transceiver being in communication with said second CPU, a first communication network and a remote dispatch station, said second modem-transceiver being in communication with said second CPU and said cellular transmission network and adapted to receive said first alarm signal, said second vehicle position signal and said vehicle identification code from said cellular antenna via said cellular transmission network, said second modem-transceiver being further adapted to transmit said first alarm signal, said second vehicle position signal and said vehicle identification code to said second CPU, said second CPU being programmed and adapted to receive said first alarm signal, said second vehicle position signal and said vehicle identification code from said second modem-transceiver, transmit said first alarm signal, said second vehicle position signal and said vehicle identification code to said dispatch station via said first modem-transceiver, and control transmissions from said first modem-transceiver to said dispatch station; and a two-way pager system, said pager system being adapted to receive said first alarm signal from said vehicle anti-theft subsystem, said pager system being further adapted to generate and transmit an activation signal to said anti-theft subsystem to activate said anti-theft subsystem.

2. The system of claim 1, wherein said movement sensor comprises a multiple axis accelerometer.

3. The system of claim 1, wherein said vehicle includes a first electrical power source and an engine.

4. The system of claim 3, wherein said vehicle immobilizing means is in communication with said engine, and wherein said engine is immobilized when said immobilizing means receives said immobilizing signal from said first CPU.

5. The system of claim 3, wherein said vehicle anti-theft subsystem includes a second electrical power source in communication with said first CPU, and wherein said first CPU is further programmed to operate said anti-theft subsystem with power from said second electrical power source when insufficient power from said first electrical power source is detected.

6. The system of claim 1, wherein said first CPU is programmed to determine movement of said vehicle from said first pre-activation vehicle position signal and said second vehicle position signal, and generate said first alarm signal from said determination.

7. The system of claim 1, wherein said first communication network comprises a local network.

8. The system of claim 1, wherein said first communication network comprises the Internet.

* * * * *